W. KLOCKE & J. E. DOBSON.
AUTOMATIC CLUTCH.
APPLICATION FILED JULY 14, 1910.
991,786.
Patented May 9, 1911.
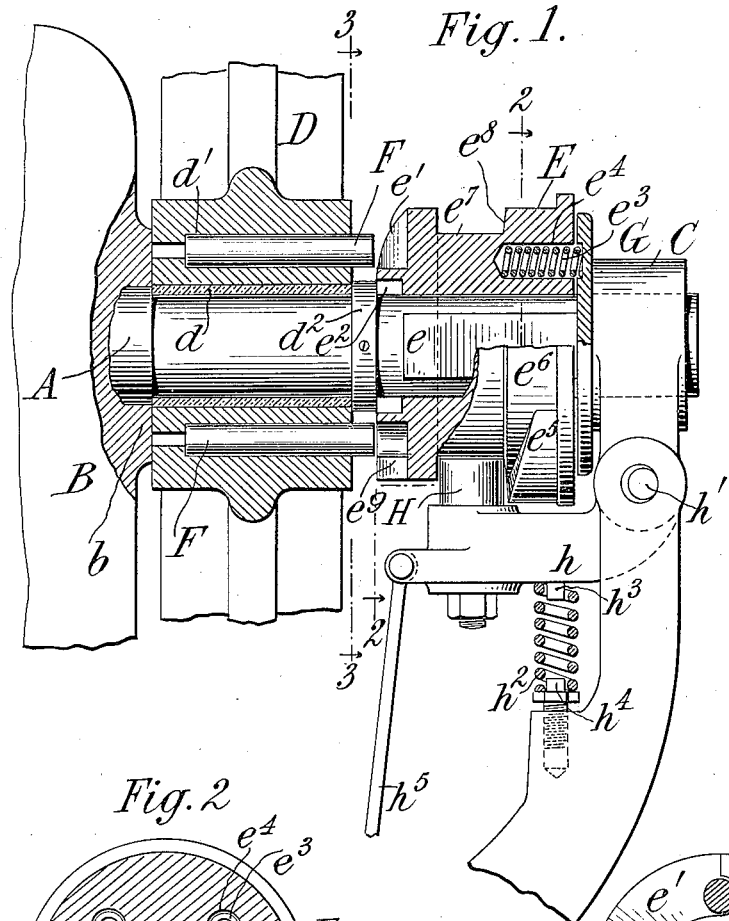
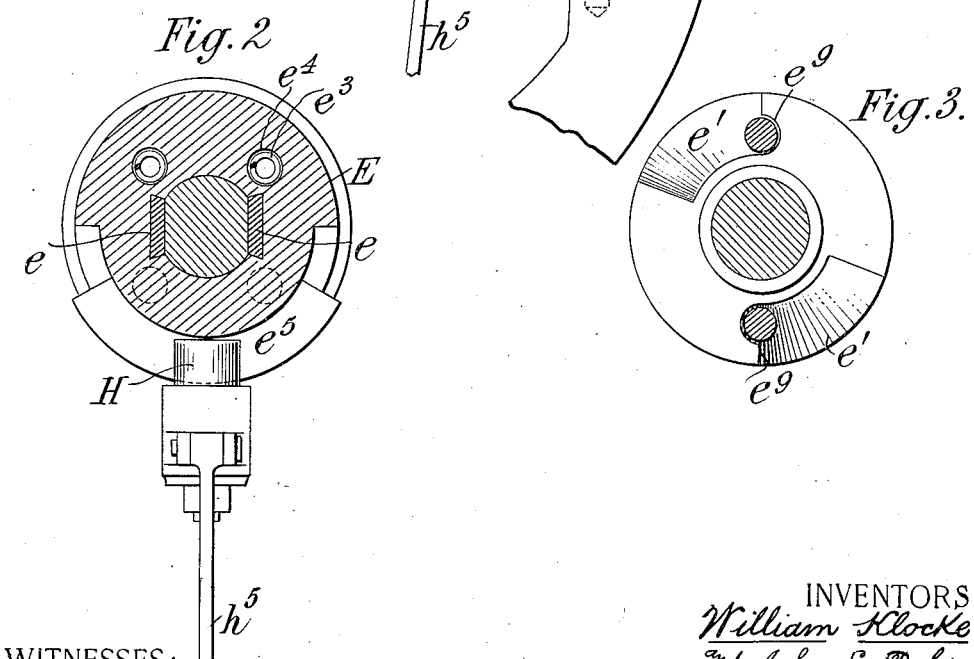
WITNESSES:
Fred White
René Bruine
INVENTORS:
William Klocke
and John E. Dobson,
By Attorneys,
Fraser Myers

UNITED STATES PATENT OFFICE.

WILLIAM KLOCKE AND JOHN E. DOBSON, OF NEW YORK, N. Y., ASSIGNORS TO E. W. BLISS COMPANY, OF BROOKLYN, NEW YORK, A CORPORATION OF WEST VIRGINIA.

AUTOMATIC CLUTCH.

991,786.  Specification of Letters Patent.  Patented May 9, 1911.

Application filed July 14, 1910. Serial No. 571,958.

*To all whom it may concern:*

Be it known that we, WILLIAM KLOCKE, residing in the borough of Brooklyn, county of Kings, city and State of New York, and JOHN E. DOBSON, residing in the borough of Manhattan, city, county, and State of New York, both citizens of the United States, have jointly invented certain new and useful Improvements in Automatic Clutches, of which the following is a specification.

Our invention relates to automatic clutches, and is particularly designed to permit the coupling of such clutches while the machine to which it is applied is operating at a high rate of speed.

This clutch will be found useful in connection with drawing, punching and stamping machines of the many kinds wherein a speed of 125 to 150 revolutions per minute is a high speed, and at such speeds it is difficult to obtain a satisfactory coupling of clutches without accident. Our machine therefore is not only designed to permit rapid and efficient coupling at such high rate of speed, but it also provides against an uneven strain upon the parts whereby the driving wheel is thrown out of balance.

A further object is to provide means for taking up or compensating for wear in parts exposed thereto.

One embodiment of our invention is illustrated in the accompanying drawings, wherein,—

Figure 1 is an elevation partly in section of a portion of a shaft and driving wheel having our improved clutch in position thereon; Fig. 2 is a section on the line 2—2 of Fig. 1 looking toward the right; Fig. 3 is a similar section on the line 3—3 also looking to the right.

In the drawings, let A represent a shaft which is supported in bearings in the main frame B of the machine and in an arm C thereof. Upon this shaft is mounted a driving wheel D, which may also act as a balance wheel. A suitable sleeve, as $d$, may be interposed if desired between the wheel D and the shaft, and the said wheel D normally revolves freely upon the said shaft. A clutch member in the form of a collar E is keyed upon the shaft A by suitable keys $e$ which engage flattened surfaces upon the said shaft and are received in dovetail channels in the clutch collar E. This connection permits the clutch collar E to slide freely axially of the shaft A, at the same time holding it to turn with said shaft. Suitable slots or channels $d^1$ are located in the hub of the driving wheel D, and in these we prefer to secure one of the coöperating members of the clutch mechanism. We have illustrated the same as consisting of pins F which are driven into the channels $d^1$ and may be removed therefrom for the purpose of substituting others should the said pins become bent or worn. Preferably the pins are constructed of hardened steel formed in any suitable shape, a convenient shape being a round one to which the said pins may be easily turned.

Upon the end of the clutch collar E opposite the clutch pins F, we locate the coöperating part of the clutch which we have illustrated in the form of stop shoulders or abutments $e^9$, and each of these abutments is provided with an inclined entrance $e^1$ which extends from the bottom of the abutment $e^9$ to the end of the clutch collar E, thereby facilitating the entrance of the clutch pins to their seats even while operating at a very high speed. We have illustrated two clutch pins F, and these are shown as being located substantially opposite each other. A greater number than this may well be employed, but we prefer not less than two, for the reason that if only one is employed the driving wheel B is thrown out of balance and caused to wear unevenly. The driving wheel is centered at one side by a hub $b$ upon the frame, and at the other side by a small collar or ring $d^2$ suitably secured to the shaft, as by screws, and a corresponding annular groove $e^2$ may be formed upon the inside of the clutch collar E to receive said ring when the clutch collar is moved in the performance of its functions.

The clutch collar E is normally spring pressed toward the driving wheel, as by suitable coiled springs $e^3$, which are illustrated as seated in recesses $e^4$ in the outer end of said clutch collar, and in similar recesses in an end collar G keyed upon the shaft A. Means are provided for moving the clutch collar E against the pressure of springs $e^3$ consisting of a peripherally disposed rotary cam $e^5$ on said collar, and a coöperating trip H which is mounted to swing in an arm $h$ having bearings at $h^1$ upon the arm C. A coiled spring $h^2$ tends to press the trip upward and is held in position by studs $h^3$ $h^4$ upon the arm $h$ and C respectively. The trip may be retracted by a link $h^5$, to which may be attached the usual foot treadle, not shown, and which may have the usual appliance for holding the treadle in its lowermost position. The rotary cam $e^5$ is mounted upon a ledge $e^6$ of the clutch collar, adjacent to which is the groove $e^7$, and the wall between said ledge and groove $e^8$ is beveled in order that when the cam rides on the trip to its highest part which is flush with the said beveled wall $e^8$, the trip H will under pressure of its spring $h^2$ pass into the groove $e^7$, and will owing to the beveled wall $e^8$ force the clutch collar far enough so that clearance will be provided between pins F and the end of the clutch collar.

While we have illustrated the pins as disposed upon the axially fixed member of the clutch and the stop shoulders or abutments upon the axially movable member thereof, this relative disposition of these parts is not essential and might be reversed.

As illustrated, the trip carrying arm $h$ has an eccentric bearing $h^1$ which is for the purpose of compensating for any wear which may take place in the trip H or the coacting face of the cam. This compensation is accomplished by simply turning the pivot pin upon which said arm $h$ is borne.

Modifications in the number and relative arrangements of the parts illustrated may be made within the scope of our invention, and we do not wish to be understood as confining ourselves to the precise shape or form or relative disposition of the said parts.

We claim as our invention:—

1. In combination, a shaft, a wheel mounted thereon to revolve free thereof, a clutch comprising a clutch member keyed on said shaft, to revolve therewith and to move axially thereon, hardened clutch pins located in perforations in said wheel and projecting from one side thereof and removable therefrom and stationary axially, when coupled or uncoupled, pin coöperating abutments on said movable member, and inclined entrances thereto.

2. In combination, a shaft, a driving wheel mounted thereon to revolve freely, a sliding clutch member keyed on said shaft, a plurality of hardened clutch pins removably mounted in perforations in said wheel, and corresponding abutments on the sliding clutch member having inclined entrances, and springs pressing said sliding clutch member normally toward said pins.

3. In combination, a shaft, a driving wheel mounted to freely revolve thereon, hardened removable oppositely disposed projecting clutch pins fixed to said wheel, a clutch collar keyed on said shaft to turn therewith, and sliding thereon, coöperating abutments on said collar having inclined entrances, a spring normally pressing said collar toward said driving wheel, a rotary cam on said collar, and a trip spring-pressed into the path of said cam, and means for withdrawing same and permitting the coupling of said clutch, and means for compensating for the wear on said trip.

4. In combination, a shaft, a clutch member mounted to slide thereon and to turn therewith and another clutch member mounted to turn freely thereon, one of said members having a perforation extending through same to receive clutch pins and permit their removal and a shoulder in said perforation adapted to provide a stop for said pins, and said perforation extending through said member from said shoulder, and hardened clutch pins snugly and removably mounted in said perforations and pin abutments on the other clutch member.

In witness whereof, we have hereunto signed our names in the presence of two subscribing witnesses.

WILLIAM KLOCKE.
JOHN E. DOBSON.

Witnesses:
FREDERIC ORTON,
GUSTAV L. JOHNSON.